J. T. DAVIS.
HYDRANT.
No. 178,120. Patented May 30, 1876.
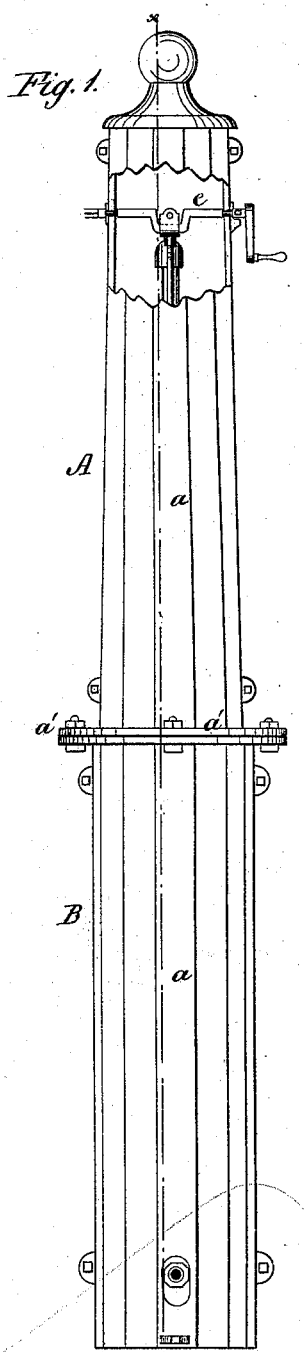
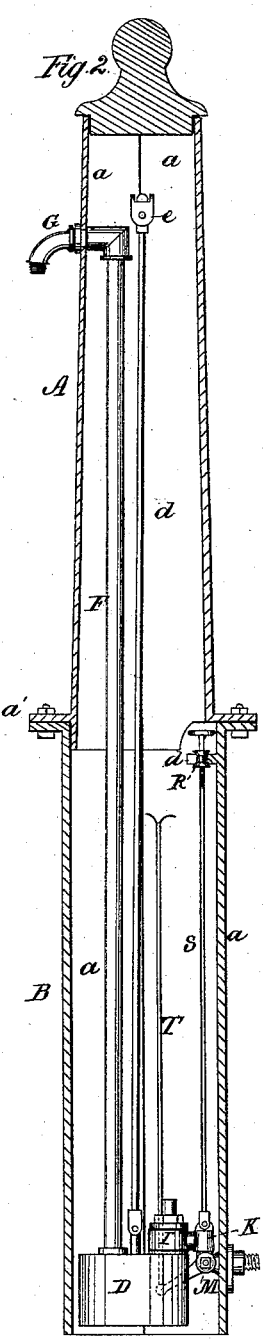
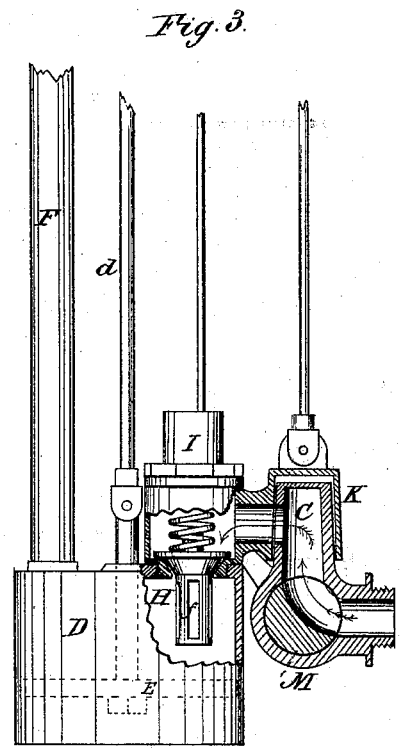
WITNESSES:
INVENTOR: John T. Davis
BY
ATTORNEYS.

UNITED STATES PATENT OFFICE.

JOHN T. DAVIS, OF WASHINGTON, DISTRICT OF COLUMBIA.

IMPROVEMENT IN HYDRANTS.

Specification forming part of Letters Patent No. 178,120, dated May 30, 1876; application filed April 28, 1876.

*To all whom it may concern:*

Be it known that I, JOHN T. DAVIS, of Washington city, District of Columbia, have invented a new and Improved Hydrant; and I do hereby declare that the following is a full, clear, and exact description of the same.

My invention relates to an improvement in the construction of the casing of the hydrant and the connection of the valve mechanism with the plug of the service-pipe, whereby the valve mechanism may be readily removed for repair or other purpose, and whereby other operations incident to keeping a hydrant in proper condition may be effected without the necessity of digging up the casing.

In the accompanying drawing, forming part of this specification, Figure 1 is an elevation of the hydrant-casing, part being broken away to show the crank. Fig. 2 is a sectional elevation. Fig. 3 is a partly sectional view of the valve mechanism and the connection thereof with the plug of the service-pipe.

The hydrant-casing is composed of top and bottom sections A B, each of which is made up of two semi-cylindrical portions, a a. The lower section B is designed to be set in the ground and support the upper section A, each being provided for this purpose with horizontal flanges a, through which pass clamp-bolts, as shown. The lower section B receives and protects the valve mechanism, as shown. The service-pipe from the main connects at the bottom portion of this section with a conical or tapered hollow plug, C.

I will next describe the valve mechanism. It is in the main similar to that illustrated in my Patent No. 150,296, and consists of the following parts: A cylinder, D, provided with a piston, E, operated by a rod, d, and handled crank-shaft e; an eduction-tube, F, connected with the cylinder D, and terminating in a curved nozzle, G, at the upper end of section A; a spring or gravity valve, H, having perforate and imperforate portions, and seated within a tube, I, attached to the cylinders D. A vertical socket or tube, K, is formed on or attached to the tube I, and provided with a tapered cavity corresponding to the aforesaid plug C of the service-pipe. When the valve mechanism is lowered into the casing, the plug C enters the socket K, and the openings in the two coincide, so that when the two-way cock M in the plug is turned to open the passage, the water will flow through the plug C into tube I, and thence (when the valve is raised by the piston E) into cylinder D, and discharge from the nozzle. The valve mechanism is supported within the casing by means of the plug C and the nozzle of the eduction-pipe.

In order to seat the plug C firmly in socket K and prevent leaking at that point, I employ a rod, S, the upper end of which is screw-threaded, and a nut, R, having a circumferential groove or two circular flanges, and provided with a handle for turning it. The nut screws on the end of the rod S, and the groove adapts it for connection with lugs or arms d, projecting inward from section B of the casing. By turning the nut in one direction the tube or socket K is pressed down and seated more firmly on the plug C. By turning it in the other direction the socket K will be started and raised partly off the plug. This latter function is important, since the socket may, in some cases, adhere firmly to the plug, especially when the connection has remained undisturbed for a long time.

It will be seen that by unscrewing the nozzle G, removing the upper section A of the hydrant, shutting off the water by turning cock M, and loosening the socket K, the entire valve mechanism and attachments may be raised and removed from section B. Repair, &c., of the same may thus be conveniently made when removed, and easy access is had to the plug C; hence, repair may, in any case, be readily made of any portion of the working mechanism without the necessity of digging up the hydrant-casing or removing the lower section from the earth. The cock M is provided with an arm, to which a rod, T, is attached. This rod is provided with a handle, and extends to the top, or thereabout, of the lower casing-section B, and is thus made conveniently accessible for adjusting the cock for letting on or shutting off the water.

In some cases I propose extending the rod to the top of section A, so that the stop-cock may be operated to shut off the water on any occasion when the temperature is so low as to render it expedient, in order to prevent freezing of the hydrant.

What I claim is—

1. The combination of the socket K with the plug C of the service-pipe, located within the hydrant-casing, as shown and described.

2. The screw-rod S and its flanged nut R, the socket K, and hollow plug C, in combination with the hydrant-casing, having arms d for embracing the nut, as shown and described.

3. In combination with hydrant-casing, having plug C fixed to the side thereof, the valve mechanism D E H and connected socket K, the discharge-pipe F, and connected nozzle G, all arranged as shown and described, whereby the said mechanism is supported within the casing, as specified.

The above specification of my invention signed by me this 27th day of April, A. D. 1876.

JOHN T. DAVIS.

Witnesses:
   SOLON C. KEMON,
   CHAS. A. PETTIT.